United States Patent [19]

Doi et al.

[11] Patent Number: 4,828,869
[45] Date of Patent: May 9, 1989

[54] PROCESS FOR THE MANUFACTURE OF PACKED ASEPTIC SOYBEAN CURD

[75] Inventors: Shuji Doi; Kiyoo Ishige, both of Kawasaki; Norio Ishida; Eiichi Irie, both of Tokyo; Yoshiro Matsumoto, Ohita; Yoshiharu Hatabe, Ohita; Atunobu Takahashi, Ohita; Nobuyuki Inoue, Ohita; Noriaki Deguchi; Hisateru Ozaki, both of Hyogo, all of Japan

[73] Assignees: Meiji Seika Kaisha, Ltd., Tokyo; Kyushu Nyugyo Co., Ltd., Ohita; Izumi Food Machinery Co., Ltd., Osaka, all of Japan

[21] Appl. No.: 47,389

[22] Filed: May 8, 1987

[30] Foreign Application Priority Data

Sep. 27, 1986 [JP] Japan ................... 61-227171

[51] Int. Cl.$^4$ .................... A23L 3/00; A23L 1/20
[52] U.S. Cl. .................... 426/656; 426/634; 426/507; 426/511
[58] Field of Search .................... 426/634, 656

[56] References Cited

U.S. PATENT DOCUMENTS

| 3,598,610 | 8/1971 | Hawley et al. | 426/634 |
| 4,000,326 | 7/1975 | Okada et al. | 426/126 |
| 4,514,433 | 10/1983 | Matsuura | 426/634 |
| 4,614,665 | 9/1986 | Furuya et al. | 426/634 |
| 4,636,398 | 1/1987 | Matsuura | 426/634 |
| 4,678,677 | 7/1987 | Sugisawa et al. | 426/634 |

FOREIGN PATENT DOCUMENTS 0201958 11/1983 Japan .................... 426/634

OTHER PUBLICATIONS

Smith et al., Soybeans: Chemistry and Technology, vol. 1, 1978, pp. 295-298.

Primary Examiner—Donald E. Czaja
Assistant Examiner—Mary S. Mims
Attorney, Agent, or Firm—Armstrong, Nikaido, Marmelstein & Kubovcik

[57] ABSTRACT

A packed aseptic soybean curd is prepared by thermally treating dehulled and hypocotyl-removed soybeans with superheated steam to sterilize same, grinding the soybeans in the presence of heated water to prepare the green slurry, filtering the slurry to separate same and to obtain a soybean milk, heating the soybean milk to sterilize the same and denature the soybean protein therein, aseptically adding a coagulant into the denatured soybean milk, filling same into and sealing an aseptic container, and then heating the soybean milk to cause a coagulation thereof in the container.

6 Claims, 3 Drawing Sheets

PROCESS FOR THE MANUFACTURE OF PACKED ASEPTIC SOYBEAN CURD

BACKGROUND OF THE INVENTION

1. Field of the Invention

The present invention relates to a process for the manufacture of a soybean curd (so-called "Tofu" in Japan) and more particularly to a process for commercially manufacturing a packed aseptic soybean curd of high quality, in a reasonable manner.

2. Related Arts

The soybean curd has an excellent flavour and mouth-feeling and can be said to be one of the high nutrient vegetable foods. Further, the soybean curd has a subtle taste and white color tone and thus shows an adaptability to various cooking products.

Hitherto, various processes have been proposed to manufacture the soybean curd. Typical conventional processes therefor will be explained with reference to a flow-chart shown in FIG. 4.

The conventional processes may be classified into (A) fine textured soybean curd (so-called "Kinu tofu" in Japan), (B) rough textured soybean curd (so-called "Momen tofu" in Japan), (C) packed soybean curd and (D) packed aseptic soybean curd. All of the conventional processes are common in steps of well-selecting and washing the soybeans, soaking the soybeans in water for 8 to 15 hours, adding water and a defoamant, grinding the soybeans to form a green slurry (or Go-puree which is called in Japan as "Namago"), directly heating the green slurry or blowing water-steam therein to form a thermally treated slurry (or cooked slurry which is called in Japan as "Go"), and squeezing the cooked slurry to obtain a soybean milk by separating a curd residue (so-called in Japan as "Okara").

According to one of the classic processes, a coagulant is added in a soybean milk and the mixture is poured into a mold to leave as it is to cause a coagulation thereof, and then exposed to water to obtain the fine textured soybean crd (A). According to another classic process, a coagulant is added in a soybean milk to allow a sedientation of coagulated substance, some amount of a spernatant is skimmed (this step is called in Japan a "Yutori") and the resulting precipitated substance is scooped out, charged into a mold, pressed therein, and exposed to water to obtain the rough textured soybean curd (B). In these classic processes, a bittern was formerly employed as the coagulant but recently, a coagulant comprising calcium sulfate as main component has been employed, since a coagulation reaction can be delayed and a resulting soybean curd shows a good water-holding capacity and somewhat more smooth feeling in mouth.

On the other hand, the production of the so-called packed soybean curd (C) has been made possible with gluconodeltalactone (hereinafter referred to as "GDL") which was developed as a new type coagulant for the soybean curd, after the second world war. The soybean curd of this kind is manufactured by cooling and deaerating a soybean milk, adding GDL therein and mixing same, filling in a container, and heating to cause a coagulation. According to this conventional process, the thermal coagulation is carried out after filling the soybean milk into the container, which makes an automatic and continuous mass production of the soybean curd easy, so that a share of the soybean curds manufactured by this type process gradually prevails in the market.

Finally, the so-called packed aseptic soybean curd (D) has been developed to provide a soybean curd which can be stored for a long period of time, at room temperature. The conventional packed aseptic soybean curd has been manufactured by thermally treating a soybean milk to sterilize the same, cooling and deaerating the sterilized soybean milk, adding thereto and mixing same with a sterilized GDL solution, filling the mixture into a sterilized container under an aseptic atmosphere, sealing the container under an aseptic condition, and heating the mixture to cause a coagulation thereof see U.S. Pat. No. 4,000,326 and U.S. Pat. No. 4,514,433.

The fine textured and rough textured soybean curds to be obtained by said classic processes show drawbacks of that its storage stability is quite low; that is perishable, even if stored under a lower temperature condition, the soybean curd tends to break-down easily, during a transportation thereof, and its manufacture requires a skill, which makes a large scale production difficult.

While, the conventional process for manufacturing the packed soybean curds somewhat dissolves the drawbacks encountered in such classic processes, but the resulting soybean curd is to be marketed and stored at a low temperature and its storage stability can not be made so high. In order to eliminate the disadvantages inherent to the packed soybean curd, the process for manufacturing the packed aseptic soybean curds has been proposed, but the soybean curd manufactured by proposed this type processes is not sufficient in that it is poor in mouth-feel and flavour, and shows a syneresis.

SUMMARY OF THE INVENTION

The inventors have carefully studied the last-mentioned type process, namely the process for the manufacture of packed aseptic soybean curds which can be stored for a long period of time, at room temperature and reached such a conclusion that the inherent problems in the "packed aseptic soybean curds" manufactured by the prior art process can be solved by, mainly, making subtle production steps of aseptic soybean milk and carrying out the subsequent protein denaturation of the soybean milk in homogeneity and uniformity.

To this end, the invention aims to solve the following problems.

(1) In the steps for producing soybean milk and sterilizing the same, an excess or irregular denaturation of the soybean protein is minimized to obtain soybean curd with a good mouth-feeling and a suitable elasticity, (2) In the steps for producing soybean milk and sterilizing the same, an excess or irregular denaturation of the soybean protein is minimized to obtain soybean curd with prevention of a syneresis.

(3) In the steps for producing soybean milk and sterilizing the same, a grassy-smell and harsh or acrid taste are minimized to obtain soybean curd with an inherent good flavour, (4) In the steps for producing soybean milk and sterilizing the same, an increase in number of living bacteria is kept as low as possible and conditions for thermal sterilization are made reasonable, and (5) The process for solving the problems 1 to 4, productivity, yield, wastewater disposal and others are made advantageous or convenient, as compared with those in the prior art processes.

According to the present invention, the problems as referred to can be solved by a process for the manufacture of packed aseptic soybean curd, which comprises steps of thermal sterilizing dehulled and hypocotyl-removed soybeans, with use of superheated steam, adding heated water to the soybeans and finely grinding same to prepare a green slurry, separating the green slurry into a soybean milk and a curd residue to obtain the soybean milk and optionally adding water to the curd residue to obtain secondary soybean milk, deaerating and heating the resulting soybean milk to sterilize same and cause a denaturation of soybean protein, aseptically adding a coagulant in the treated soybean milk, filling same into and sealing an aseptic container, under aseptic atmosphere, and causing a coagulation of the soybean milk packed in the container.

DETAILED DESCRIPTION OF THE PREFERRED EMBODIMENTS

Figure 1:
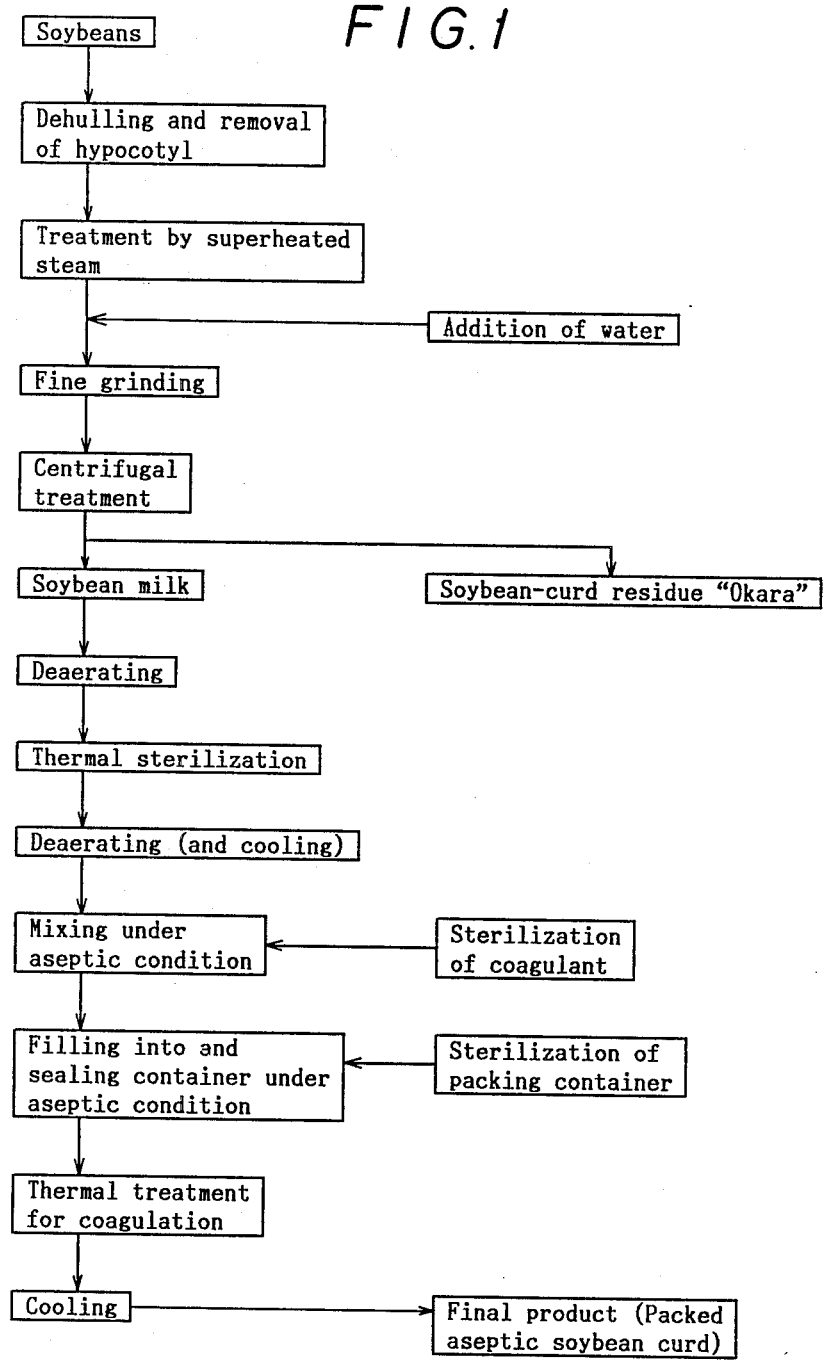
FIG. 1 is a flow-chart showing a process for the manufacture of packed aseptic soybean curds, according to the invention.

The invention will now be further explained on a preferred embodiment which is shown in FIG. 1.

In the first place, a process according to the invention will be explained step by step with reference to FIG. 1.

(1) First Step

This step comprises treatment for mechanically dehulling soybeans, mechanically removing a hypocotyl thereof, and thermal sterilizing the soybeans with superheated steam.

A main purpose of this step lies in removal of glucoside components as much as possible, which are contained in the soybeans and show bitter, harsh, acrid or other undesirable taste.

A distribution of glucoside components in the soybeans is shown in following Table 1 [see "Kagaku-to-Seibutu (translated as —Chemistry and Living Things—)" Vol. 22, No. 1, Pages 11–14].

TABLE 1

|  | Cotyledon (%) | Hypocotyl (%) | Hull (%) |
|---|---|---|---|
| Weight ratio | 91.49 | 2.04 | 6.17 |
| Content of glucoside | 0.90 | 6.33 | 0.20 |
| Content of crude saponin | 0.26 | 2.78* | 0.03 |
| Content of crude isoflavonoids | 0.61** | 1.77*** | 0.12 |
| Glucoside distribution | 85.34 | 13.38 | 1.28 |

In Table 1.
*A main component is soya-saponin A,
**Genistin content > Daidzin content
***Genistin content < Daidzin content It is apparent from Table 1 that the glucoside components showing bitter, harsh, acrid or other unpleasant taste are contained in the hypocotyl in higher ratio. Therefore, the soybeans employed for the present invention are dehulled and hypocotyl thereof is removed, so as to decrease the undesirable taste. In another view point, according to the process of the invention, a step of soaking soybeans in water and another step of immersing a formed soybean curd as in the classic processes are omitted, which means a preparation of soybean milk having good flavour is one of essential requirement and thus the dehulled and hypocotyl-removed soybeans are employed for the invention.

A secondary purpose of the first step lies in momentarily treating the dehulled and hypocotyl-removed soybeans to kill bacteria and more particularly those with heat resistance spore and to decrease number of same to substantially zero.

In conventional processes, a pretreatment of immersing soybeans in a sterilizing solution such as sodium hypochlorite solution for a predetermined period of time to reduce number of bacteria or of radiating ultra-violet rays to soybeans while soaking same in water to prevent a proliferation of bacteria has been carried out and such pretreatment has been known as one of measures for extending a life of the resulting soybean curd. However, these pretreatments have disadvantages of that chemicals such as the sodium hypochlorite is required or a load for waste water treatment become larger.

In order to eliminate the disadvantages, the inventors has studied to reach a measure of flash sterilizing the dehulled and hypocotyl-removed soybeans with superheated steam. They, therefore, carried out following Experiment 1 for establishing conditions preferable for the measure or treatment.

EXPERIMENT 1

Dehulled and hypocotyl-removed soybeans were treated with superheated steam at various temperature ranging from 125° to 225° C. for 1 to 2 seconds. After the treatment, number of remaining bacteria on the treated soybeans, solid extraction coefficient from the soybeans and a curd tension of soybean curd were measured in the manner as follows.

1. Number of remaining bacteria

Measured by a conventional method. Number of bacteria with heat resistant spore was measured with use of a sample solution which was treated by heating same at 90° C. for 10 minutes.

2. Extracted solid concentration

To the thermal treated soybeans, water heated at 55° C. and in an amount of 4 times by weight based on the soybeans was added. The soybeans were finely ground and a resulting green slurry (Namago) was centrifugally treated to obtain a soybean milk. An extracted solid concentration in the soybean milk was measured with use of a soybean milk densitometer (Type SM-20 manufactured by Atago Mfg. Co. Ltd., of Japan).

3. Curd tension of soybean curd product

To the thermal treated soybeans, water heated at 60° C. and in an amount of 5 times by weight based on the soybeans was added. The soybeans were finely ground and a resulting green slurry was centrifugally treated to obtain a soybean milk. The soybean milk was heated at 140° C. for 3 seconds, cooled, and magnesium chloride as a coagulant was added in the amount 0.3% by weight. The mixture was heated for coagulation to obtain a soybean curd. A curd tension of the product was measured at 10° C. with use of a rheometer (Adapter No. 5, manufactured by Fudo Kogyo Co., Ltd. of Japan).

Results are shown in following Table 2.

TABLE 2

| Temperature (°C.) | Number of remaining bacteria (number/g) | | Extracted solid concentration (weight %) | Curd tension of product (g weight) |
| --- | --- | --- | --- | --- |
| | Number of general bacteria | Number of thermal resisting bacteria | | |
| Control (Omitted the treatment with superheated steam) | 170 | 40 | 15.0 | 204 |
| 125 | 40 | 11 | 15.1 | 200 |
| 150 | 0 | 0 | 15.0 | 195 |
| 175 | 0 | 0 | 14.8 | 189 |
| 200 | 0 | 0 | 14.6 | 164 |
| 225 | 0 | 0 | 13.5 | 136 |

As seen from Table 2, the superheated steam having a temperature range of 150° to 200° C. is required to obtain a desired result, since on one hand, thermally resistant bacteria can not completely be killed, if the temperature is below 150° C. and the other hand, if the temperature exceeds 200° C., a thermal denaturation is caused in soybean components and more particularly in protein one to decrease the solid extraction coefficient in the soybean milk and the curd tension of the soybean curd, which become one of causes for making impossible to obtain a desired final product having preferable physical properties.

According to this first step, as referred to, it is possible to remove as much as possible the glucosides which show bitter, harsh, acrid and other undesirable tastes, to minimize number of bacteria and more particularly those with heat resistant spore, and to improve in quality and storage stability of the final product of the soybean curd. Further, this step requires no soaking of the soybeans and thus a concerned waste water treatment can be omitted.

(2) Second Step

In this step, the soybeans treated in the first step are finely ground in the presence of heated water to prepare a green slurry of soybeans (Namago).

A main purpose of this step lies in efficient extraction of soybean protein during the fine grinding treatment of the soybeans.

According to the conventional processes, soybeans are soaked in water at 10° to 15° C. for 12 to 15 hours (winter season) or at 15° to 20° C. for 8 to 10 hours (summer season) and then finely ground in the presence of a defoamant to prepare a green slurry. Such a conventional process has drawbacks in that a relatively large amount of soaking water is required to give a large load in view of a waste water treatment and that soybean protein can not be efficiently extracted from the soybeans.

In order to overcome the drawbacks, the inventors have studied and reached a measure of adding heated water to the soybeans treated previously with superheated steam, without soaking same in water. To this end, following Experiment 2 was carried out for establishing preferable conditions therefor.

EXPERIMENT 2

To the soybeans which are dehulled, hypocotyl-removed and treated with superheated steam at 170° C. for 1 to 2 seconds, heated water at a various temperature, e.g. not exceeding 80° C., ranging from 20° to 80° C. was added in an amount of 5 times by weight based on the soybeans. The soybeans were finely ground in the presence of the heated water and the resulting green slurry was centrifugally treated to obtain a soybean milk. A recovering rate of solids from the soybeans to the soybean milk was measured and the resulting value was made as a solid extraction coefficient.

Figure 2:
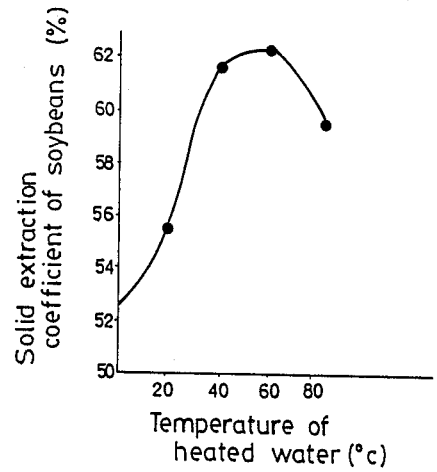
FIG. 2 is a graph showing a relation between temperature of heated water and a solid extraction rate of soybeans.

A relation between the temperature of heated water and the solid extraction coefficient of the soybeans is shown in FIG. 2.

As seen from the FIGURE, an appropriate temperature of the heated water is in the range of 40° to 65° C. and more preferably of 50° to 60° C. and if the temperature of the heated water below the lower limit or higher than the upper limit of the range, the extraction efficiency of the solid, namely protein from the soybeans reduces. A heated water addition rate varies depending on a protein concentration of soybean milk, which will be made different based on physical properties required for the final product of soybean curd, but in general, the heated water is added in an amount of 4 to 7 times by weight based on the soybeans.

A secondary purpose of this second step lies in minimization of denaturation or modification which may be caused in the finely ground material, during the grinding treatment.

In the conventional processes, a discoloration of soybean milk from white to light brown (this phenomenon is called in Japan as "Goyake") has been recognized, when the soybeans are finely ground and it was impossible to prepare any soybean milk with use of soybeans not soaked in water.

The inventors have studied as to a cause of the discoloration (Goyake) to find that oxygen is involved in the phenomenon. Namely, it has been elucidated that polyphenols in the soybeans are oxidized by polyphenol oxidase activated by oxygen to cause the discoloration of soybean milk. This means that a migration of oxygen should be prevented as much as possible, during the finely grinding treatment of the soybeans. This is also confirmed from results of following Experiment 3.

EXPERIMENT 3

1 weight part of various soybean samples was added in 5 weight parts of heated water at 60° C., finely ground, and centrifugally treated to obtain a soybean milk. The soybean milk was measured by a tintmeter (Type ND-504AA, manufactured by Nippon Densyoku Kogyo Co. Ltd. of Japan).

Results are shown in following Table 3.

TABLE 3

| | Open system | | | Closed system | | |
| --- | --- | --- | --- | --- | --- | --- |
| | L | a | b | L | a | b |
| Non-dehulled soybeans | 73.14 | −0.26 | 14.44 | 73.82 | −1.12 | 16.12 |
| Dehulled and hypocotyl-removed soybeans | 79.65 | 0.07 | 14.17 | 81.26 | −1.02 | 15.88 |
| Dehulled and hypocotyl-removed soybeans (treated by superheated steam) | 80.02 | 0.02 | 14.30 | 81.40 | −1.08 | 15.90 |

Note:
Open system; Grinding under state to allow air taken in,
Closed system; Grinding under state without air taken in.

In the Table, the characteristic values L, a and b are those measured by the tintmeter and shown according to the Hunter Color Displaying Method. The value L relates to luminosity, a relates to hue and designates that a greater value in positive side shows a higher degree in red color, zero value shows the color of gray and a greater value in negative side shows a higher degree in green color, and b relates to saturation and designates that a greater value in positive side shows a higher degree in yellow color.

As seen from Table 3, the characteristic value a obtained on the closed system which does not allow the migration of oxygen is lower than that obtained on the open system which allows the migration of oxygen and thus it is one of important matters to prevent the oxygen from being taking in, when the soybean milk is prepared.

A prevention of oxygen migration may be attained by carrying out the fine grinding treatment under a state that a grinding tank is completely filled by the soybeans and heated water, under a reduced pressure condition, under an inert gas atmosphere or by utilizing any combination thereof.

It is preferable to carry out the fine grinding in plural stages, for instance double stage system, in which a cutter type coarse grinder may be employed in the first stage and a mill-type fine grinder in the second stage.

A third purpose of this second step lies in preventing a proliferation of bacteria. This purpose can be attained by carrying out this step with use of the treated soybeans obtained through the first step, as apparently seen from results of following Experiment 4.

EXPERIMENT 4

A number of general bacteria on soaked soybeans which have been employed in conventional processes was counted.

(a) Soaking condition

Soybeans were added in water in an amount of 2.5 times by weight based on the soybeans.

(b) Measuring condition on number of general bacteria

Soybeans were added in water in an amount of 6.0 times by weight based on the soybeans and finely ground with use of a mixer, counted a number of bacteria in a manner known per se, and the counted value was converted into a number of bacteria per 1 gram of the soybeans.

(c) In Test Group 3, sample soybeans similar to those employed in Test Group 2 were soaked in water and then washed with water in same amount with the soaking water.

Results are shown in following Table 4.

TABLE 4

| Test groups | Number of general bacteria (number/gram) |
|---|---|
| (1) Control (non-soaking) | $74 \times 10$ |
| (2) Soybeans soaked in water at 10° C. for 16 hours | $71 \times 10^4$ |
| (3) Soybeans as in (2) and then washed with water in same amount with soaking water | $13 \times 10^4$ |
| (4) Soybeans saoked in water at 20° C. for 8 hours | $17 \times 10^4$ |

As seen from the Table, the conventional processes show a disadvantage in that the number of bacteria increases through the soaking step on the order of about $10^3$, which is not only undesirable from the view point of total sanitation in the manufacture of aseptic soybean curds, but also requires an additional system for sterilizing the soaking water before disposal thereof.

According to the second step of the process of the present invention, the denaturation and modification of the finely ground soybeans can be minimized, the soybean protein can efficiently be extracted, and the proliferation of bacteria can be prevented, due to omission of the soaking procedure.

(3) Third Step

In this step, the green slurry (Namago) obtained by the second step is centrifugally treated with use of a continuous centrifugal separator such as a decanter or the like to separate into a soybean milk and a curd residue (Okara) and if necessary a predetermined amount of water is added to the curd residue to further carry out a centrifugal treatment for obtaining additional amount of a soybean milk which may be combined with the firstly obtained one.

A purpose of this step lies in efficient separation of soybean protein component from the green slurry.

According to the conventional processes, the green slurry has been thermally treated with use of, for instance steam to form the cooked slurry (Go) and then this slurry is subjected to squeezing treatment to separate into a soybean milk and a curd residue and thus a part of the soybean protein may be heat-denatured to become insoluble and adhere to the curd residue, impairing the efficient separation of the soybean protein from the curd residue.

According to the third step of the present invention process, the soybean protein component can effectively be separated from the green slurry, as seen from results of following Experiments 5 and 6.

EXPERIMENT 5

(1) Control soybean milk sample (conventional process)

Non-dehulled soybeans were soaked in water at 20° C. for 10 hours, washed with water, and water at various temperature was added to the washed soybeans, so that the water becomes 5.0 times by weight based on the soybeans, and then the soybeans were finely ground. Steam was injected into a resulting green slurry to heat same at 96°–98° C. for 3 minutes, so as to convert the green slurry into a cooked slurry. The slurry was filtered to obtain a soybean milk.

(2) Test soybean milk sample (process of present invention)

Dehulled and hypocotyl-removed soybeans were thermally treated with superheated steam (170° C., 1 to 2 seconds), finely ground in the presence of water at various temperature and in an amount of 5.0 times by weight based on the soybeans, and then centrifugally treated to obtain a soybean milk.

A solid extraction coefficient in each of said samples was measured by a conventional method. Results are shown in following Table 5.

As seen from the Table, a solid extraction coefficient of the present invention is higher than that of the conventional process.

TABLE 5

| | Soybean milk sample | |
|---|---|---|
| Grinding temperature (°C.) | Control (weight %) | Test (weight %) |
| 40 | 56.5 | 61.7 |
| 60 | 57.4 | 62.5 |

TABLE 5-continued

| Grinding temperature (°C.) | Soybean milk sample | |
|---|---|---|
| | Control (weight %) | Test (weight %) |
| 80 | 54.4 | 59.6 |

EXPERIMENT 6

Dehulled and hypocotyl-removed soybeans were thermally treated with superheated steam (170° C., 1 to 2 seconds), finely ground in the presence of water at various temperature and in an amount of 5.0 times by weight based on the soybeans, and then centrifugally treated to obtain a primary soybean milk (single stage product) which was divided into two groups.

On the other hand, water in same amount as with the soybeans was added to a curd residue (Okara) which was obtained through the centrifugal treatment for obtaining said single stage product and the resulting slurry was stirred and centrifugally treated to obtain a secondary soybean milk. This secondary soybean milk was added to one of the groups in said primary soybean milk to obtain a combined soybean milk (double stage product).

A solid extraction coefficient in each of the single stage and double stage products was measured. Results are shown in following Table 6.

TABLE 6

| Grinding temperature (°C.) | Single stage product (weight %) | Double stage product (weight %) |
|---|---|---|
| 40 | 61.7 | 69.5 |
| 60 | 62.5 | 70.3 |
| 80 | 59.6 | 62.2 |

As seen from the Table, the solid extraction coefficient is higher in the double stage product than in the single stage product and thus it is preferable to carry out the extraction in double stages.

As referred to above, this third step is an excellent one, since the soybean protein can efficiently been extracted and the soybean milk having a high protein concentration can be obtained, while preventing a denaturation of the protein component in the soybean milk.

(4) Fourth Step

In this step, the soybean milk obtained by the third step is deaerated, thermally treated directly or indirectly at a temperature above 115° C. for at least 1.0 seconds, with use of a thermal sterilizing device to cause a thermal denaturation of soybean protein in the soybean milk, so that a reactivity of the soybean protein with a coagulant in subsequent step is improved and bacteria are killed to make the soybean milk in aseptic state, then the aseptic soybean milk is deaerated again, homogenized with use of a high pressure homogenizer and cooled, if an occasion demands.

As the thermal sterilizing device to be used, a plate-type, tube-type, direct steam injection-type or the like device known per se may selectively be employed.

In connection with this, please note that it has been said that the plate and tube-type devices are not suitable for carrying out the conventional processes, since a thermally denatured protein adheres to the plate or inner surface of the tube, readily forming a scale which makes continuous operation in long period of time difficult and causes an uneven heating, to provide a final soybean curd with undesirable physical properties or of a poor quality.

However, such disadvantages encountered in the prior processes disappear by carrying out this fourth step of the present invention process, as seen from results of following Experiment 7.

EXPERIMENT 7

(1) Control soybean milk (conventional process)

Non-dehulled soybeans were soaked in water at 20° C. for 10 hours, washed with water, finely ground in the presence of water in an amount of 6.0 times by weight based on the soybeans and a defoamant, thermally treated at 96° to 98° C. for 3 minutes by injecting steam therein, and filtered to obtain a control soybean milk.

(2) Test soybean milk (present invention process)

Dehulled and hypocotyl-removed soybeans were treated by superheated steam (170° C., 1 to 2 seconds), finely ground in the presence of heated water at 60° C. and in an amount of 5.0 times by weight based on the soybeans, and centrifugally treated to obtain a test soybean milk.

(3) Measurement of viscosity

A viscosity of the control and test soybean milks was measured with use of a viscometer [Vistron (trade mark), Type VA-1, Rotor No. 1, manufactured by Tokyo Keisoku Co., Ltd., of Japan] and under the sample temperature of 10° C.

(4) Results and evaluation

Results are shown in following Table 7. As seen from the Table, the viscosity of test soybean milk prepared by the fourth step in the process of the present invention is about 1/5, in comparison with that of the control soybean milk prepared in accordance with the conventional process, in spite of the fact that each of the soybean milks has same protein concentration.

TABLE 7

| Testing Item | Soybean milk | |
|---|---|---|
| | Control | Test |
| Content of protein (weight %) | 5.5 | 5.5 |
| Viscosity (cps) | 53.4 | 10.5 |

EXPERIMENT 8

Following test was carried out for setting thermal treating conditions to make the soybean milk into aseptic state.

Dehulled and hypocotyl-removed soybeans were treated with superheated steam at 150° C. for 1 to 2 seconds, finely ground in the presence of heated water at 60° C. and in an amount of 5.0 times by weight based on the soybeans, and centrifugally treated to obtain a test soybean milk. The test soybean milk was thermally sterilized at various temperatures to measure a period of time required to make the soybean milk to an aseptic state.

Results are shown in following Table 8. As seen from the Table, the soybean milk can be made in the aseptic state by heating same at 120° C. for more than 10 seconds and at 130° C. for more than 1 second.

TABLE 8

| Thermal treating temperature (°C.) | Required period of time (seconds) |
|---|---|
| 115 | >30 |
| 120 | >10 |
| 130 | >1 |

TABLE 8-continued

| Thermal treating temperature (°C.) | Required period of time (seconds) |
| --- | --- |
| 140 | >1 |
| 150 | >1 |

Following Experiments 9 and 10 were carried out for setting conditions to cause a thermal denaturation of soybean protein in the soybean milk, so that the protein can react with a coagulant to cause a coagulation thereof.

EXPERIMENT 9

Dehulled and hypocotyl-removed soybeans were treated with superheated steam at 170° C. for 1 second, finely ground in the presence of water in amount of 5 times by weight based on the soybeans, and centrifugally treated to obtain a test soybean milk. The test soybean milk was thermally treated in various conditions, GDL was added in an amount of 0.3 weight % to a resulting thermally denatured soybean milk and then the mixture was charged in a container and heated therein to cause a coagulation and to obtain a soybean curd (Tofu).

A curd tension of the resulting soybean curd was measured with use of a rheometer (Adaptor No. 5, manufactured by Fudo Kogyo Co., Ltd. of Japan) and under sample temperature of 10° C.

Figure 3:
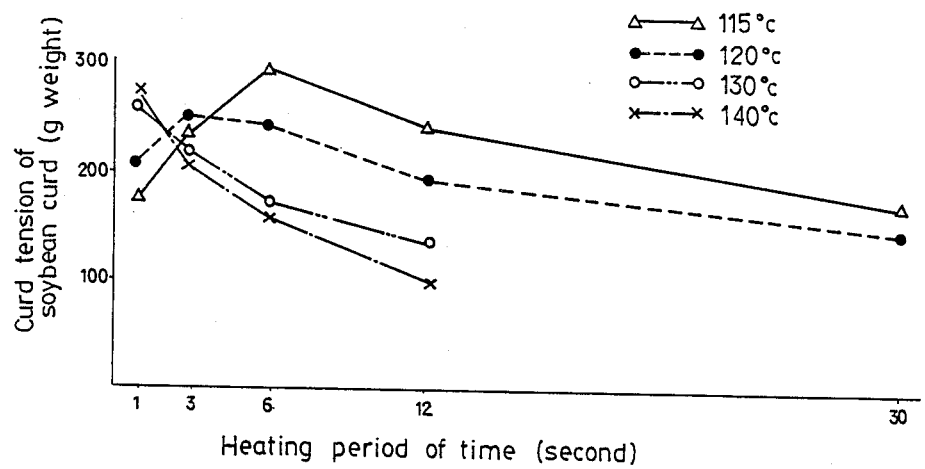
FIG. 3 is a graph showing a relation between heating conditions and a curd tension of soybean curd.
Figure 4:
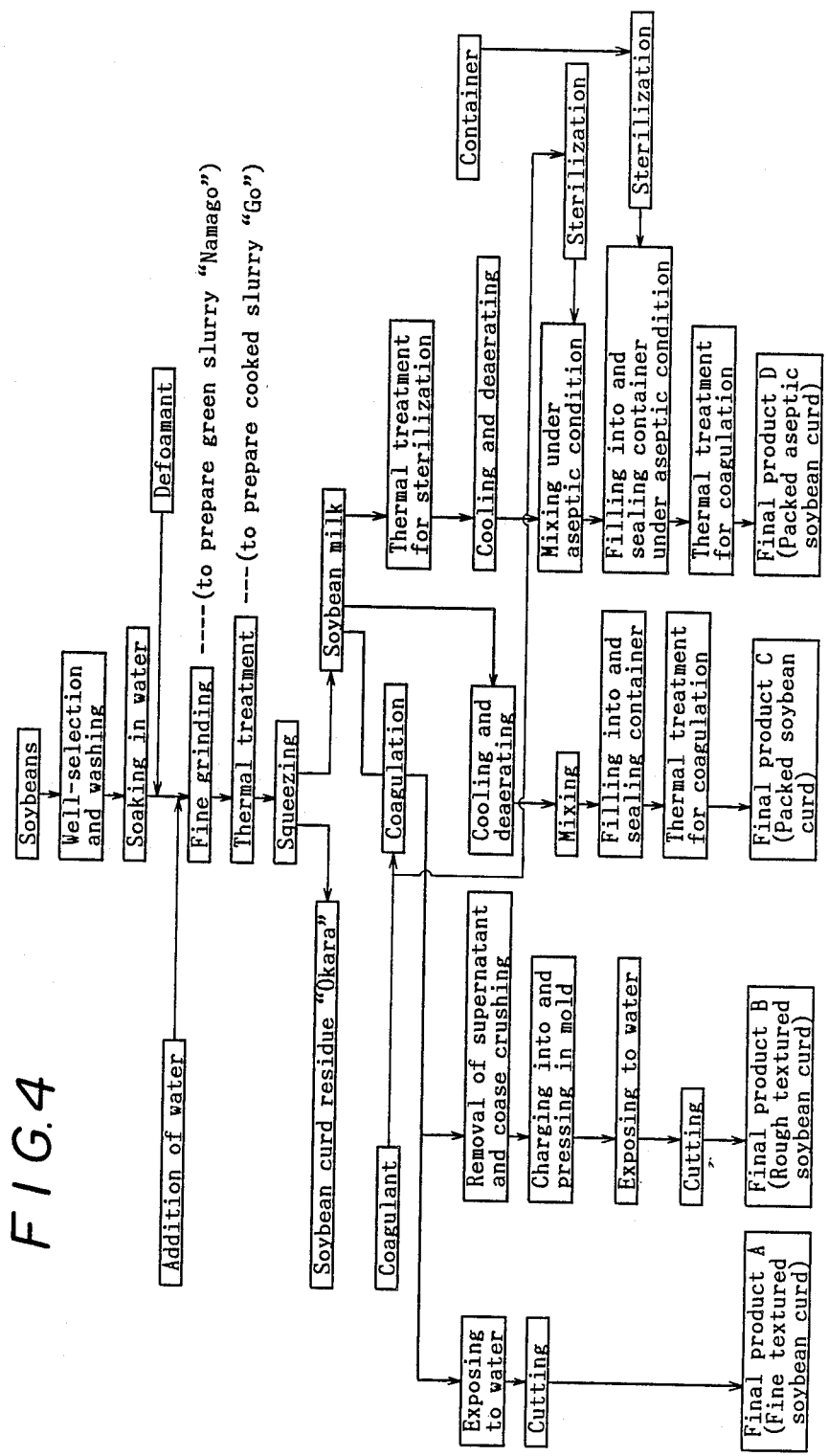
FIG. 4 is a flow-chart showing prior art processes for the manufacture of soybean curds in various kinds.

Relations between the thermal treating conditions and measured curd tension are shown in FIG. 3. In connection with this Figure, please note that a generally required curd tension is 150 g weight or more and a soybean curd with a curd tension less than 150 g weight is not preferable, since such soybean curd is too soft.

EXPERIMENT 10

(1) Control soybean curd A (conventional process)

Non-dehulled soybeans were soaked in water at 20° C. for 10 hours, washed with water, finely ground in the presence of water in an amount of 5.0 times by weight based on the soybeans together with a defoamant, thermally treated at 96° to 98° C. for 3 minutes by injecting steam therein, filtered to obtain a soybean milk. The soybean milk was cooled, GDL was added thereto in an amount of 3 weight % and the resulting mixture was charged in a container and thermally coagulated, after sealing of the container, to obtain a control soybean curd A.

(2) Control soybean curd B (conventional process)

A soybean milk as obtained by said Item 1 was thermally treated at various temperature to sterilize same and then cooled. Aseptic GDL was added in an amount of 0.3 weight % to the resulting aseptic soybean milk and the mixture was charged in a container and thermally coagulated, after sealing of the container, to obtain a control soybean curd B (aseptic one).

(3) Test soybean curd (present invention process)

Dehulled and hypocotyl-removed soybeans were treated with superheated steam at 170° C. for 1 second, finely ground in the presence of heated water at 60° C. and in an amount of 5.0 times based on the soybeans, centrifugally treated to obtain a soybean milk. The soybean milk was thermally treated at various temperatures to sterilize same and then cooled. Aseptic GDL was added in an amount of 0.3 weight % to the resulting aseptic soybean milk and the mixture was charged in a container and thermally coagulated, after sealing of the container, to obtain a test soybean curd (aseptic one).

(4) Measurement of curd tension

Each curd tension of the control soybean curds and test soybean curds was measured with use of a rheometer (Adaptor No. 5, manufactured by Fudo Kogyo Co., Ltd. of Japan) and under sample temperature of 10° C.

The measured curd tensions are shown in following Table 9.

TABLE 9

| Thermal sterilizing conditions | Curd tension of soybean curd | | |
| --- | --- | --- | --- |
| | Control A (g weight) | Control B (g weight) | Test (g weight) |
| Steam (96–98° C., 3 minutes) | 200 | — | — |
| 130° C. × 3 seconds | — | 164 | 220 |
| 140° C. × 3 seconds | — | 152 | 210 |

As seen from the Table, the soybean curds (Test samples) manufactured by the process according to the present invention have the value substantially same with that in the soybean curds (Control A samples) manufactured by conventional classic process and are far better than the conventional packed aseptic soybean curds (Control B samples).

From results as shown in FIG. 3 and Table 9, it can be appreciated that the thermal treating conditions for providing a sterilization and denaturation of the soybean milk are preferably higher than 115° C. and more than 1 second.

(5) Fifth Step

In this step, a coagulant is aseptically added in a sterilized and denatured soybean milk, and the resulting mixture is filled and packed in an aseptic container under an aseptic atmosphere.

The coagulant may be selected from GDL, bivalent metal salts such as calcium chloride, calcium sulfate, magnesium chloride, magnesium sulfate and the like as well as any mixture thereof.

Following experiment was carried out to compare curd tensions of various soybean curds manufactured with use of each of said coagulants and each of soybean milks which are prepared in accordance with the present invention process and the conventional process, respectively.

EXPERIMENT 11

(1) Method for the preparation of each soybean milk

Each soybean milk sample was prepared as in the manner as described on Experiment 10.

(2) Method for the manufacture of each soybean curd

Each of the soybean milk sample was thermally sterilized at 140° C. for 3 seconds. In case of calcium sulfate being selected as the coagulant, the sterilized soybean milk was cooled to 75° C., the coagulant was added thereto in an amount of 0.3 weight % and the resulting mixture was maintained at 75° C. for 25 minutes and then cooled to obtain a soybean curd. In case of the coagulant other than calcium sulfate being selected, the sterilized soybean milk was cooled to 15° C., the coagulant was added thereto in an amount of 0.3 weight %, and the resulting mixture was heated to 90° C., kept at the temperature for 40 minutes and then cooled to obtain a soybean curd.

(3) Measurement of curd tension

Curd tension of each soybean curd was measured with use of a rheometer (Adaptor No. 5, manufactured by Fudo Kogyo Co., Ltd. of Japan) and under sample temperature of 10° C.

A relation between the curd tension of each soybean curd and the coagulant as used is shown in following Table 10.

TABLE 10

| Coagulant | Manufacturing process of soybean curd | |
|---|---|---|
| | Conventional process (g weight) | present invention (g weight) |
| Magnesium chloride | 136 | 189 |
| Calcium chloride | 125 | 175 |
| Calcium sulfate | 130 | 180 |
| GDL | 152 | 210 |

As seen from the Table, the soybean curd having a high curd tension value and in other words, providing prevention of syneresis can be obtained according to the present invention, even if any of the coagulants is selected. In connection with this, please note that only one coagulant, namely GDL can provides an acceptable soybean curd, if the soybean milk prepared by the conventional process is employed and coagulated under said conditions.

As a general tendency in applying each of the coagulants for the process of the present invention, magnesium chloride and calcium chloride have high solubility in water and thus if the compound is added to the soybean milk at higher temperature, a momental coagulation reaction shall occur to provide an undesirable soybean curd which has a low water-holding capacity to give a crumbling mouth-feel. Therefore, it is preferable to add the compound (coagulant) in the soybean milk at temperature not higher than 20° C. When calcium sulfate is selected as the coagulant, the compound has a low solubility in water and gradually reacts with the soybean milk, even if the soybean milk is in higher temperature and thus it is preferable to add the compound to the soybean milk at higher temperature of 70° to 75° C. On the other hand, GDL in an aqueous solution will decompose in a relatively short period of time and thus it necessary to dissolve the same in water at low temperature and uniformly mix the aqueous solution to the soybean milk at low temperature.

The soybean curd manufactured with use of magnesium chloride or calcium chloride as the coagulant has a good water-holding capacity and shows a desirable elasticity. The soybean curd manufactured with use of calcium sulfate as the coagulant exhibits a good water-holding capacity and a smooth texture, but if calcium sulfate was employed in an excess amount, the resulting soybean curd exhibits an inherent harsh or acrid taste due to sulfuric acid ion. Further, the soybean curd manufactured with use of GDL as the coagulant will show a somewhat hard but a lumpy taste and if GDL was employed in an excess amount, the resulting soybean curd exhibits a somewhat sour taste due to its decomposed product of gluconic acid.

For sterilizing the coagulant, any of known methods of filtration and alcoholic sterilization method may be employed. Further, as to the coagulant of bivalent metal salts, a thermal sterilization, ultraviolet ray radiating sterilization or the like may be employed.

In other words and according to the invention, a suitable coagulant can be selected, by taking required physical properties of the final soybean curd products, aseptic treating procedure, coagulant adding manner and others into consideration.

For filling the soybean milk into an aseptic container and sealing the container in aseptic atmosphere, any of conventional manners developed and widely employed for cow's milk, beverages, desserts and the like may be employed, but taking a form of the container for the final soybean curd product into consideration.

This fifth step provides advantages in that the coagulant can easily and unformly be mixed with the soybean milk in a short period of time, since the sterilized soybean milk obtained through the fourth step has a lower viscosity than the soybean milk obtained by the conventional process, that various equipments may be employed, since no acute increase in viscosity occurs, even if magnesium chloride, calcium chloride or the like bivalent metal salt is employed as the coagulant, that there is no limitation on kind of the coagulant, and that the final soybean curd product is excellent in its physical properties and shows a good stability in quality.

(6) Sixth Step

In this step, the packed aseptic soybean curd is immersed in hot water at 70° to 100° C. for 20 to 60 minutes or subjected to showering with hot water under similar conditions to cause a coagulation of the soybean milk in the container and then cooled in cold water. However, this step per se has been well known in the art and thus an explanation on this step will be omitted.

The present invention will now be further explained with reference to manufacturing Examples and Test Example on sensory test and water content measurement (syneresis therefrom).

EXAMPLE 1

300 kg of dehulled and hypocotyl-removed soybeans (Japanese production) were treated by superheated steam at 170° C. for 1 to 2 seconds with use of a tower-type sterilizing device (manufactured by Kikkoman Syoyu Co., Ltd. of Japan), 1620 kg of heated water at 50° C. were added thereto and then the soybeans were ground in double stages with use of a coarse grinder (—High Vis Line Mixer—manufactured by Tokusyu Kika Kogyo Co., Ltd. of Japan) and a fine grinder (—Micolloider—manufactured by Tokusyu Kika Kogyo Co., Ltd. of Japan), respectively, air in inner upper space of the grinders being substituted with nitrogen gas. The resulting green slurry was centrifugally treated with use of a centrifugal separator (—Decanter HS-324L—manufactured by Ishikawajima Harima Jyukogyo Kabushiki kaisha of Japan) to separate into a soybean milk and a curd residue (Okara). To the curd residue, 240 kg of heated water at 50° C. were added and the substance was stirred and then centrifugally treated again to separate into a secondary soybean milk and a residue (curd residue or Okara). The secondary soybean milk was combined with the firstly obtained soybean milk. Yield of the combined soybean milk was 1870 kg and the soybean milk showed a solid content of 12.0 weight % protein content of 5.1 weight % and viscosity of 9.5 cps.

The resulting soybean milk was deaerated and thermally treated with use of a direct steam injection type sterilizer (Type SDI-2500, manufactured by Izumi Food Machinery Co., Ltd. of Japan) at 130° C. for 3 seconds, cooled to 20° C. and transferred to an aseptic tank.

Meanwhile, 25 weight % aqueous solution of GDL was debacterized by passing same through a debacterizing filter (—membrane filter—, type SD-1 manufactured by Millipore Ltd.) to obtain an aseptic coagulant solution.

The aseptic coagulant solution was added in an amount of 1.2% by volume to and mixed with the aseptic soybean milk under aseptic atmosphere and filled in each aseptic container which was sealed under aseptic atmosphere, with use of an aseptic packing and sealing device (Type AB3, manufactured by Tetrapack Co., Ltd.). The containers accommodating the mixture of soybean milk and coagulant were immersed in hot water at 90° C. for 50 minutes and then cooled by cold water to room temperature to obtain packed aseptic soybean curds.

The resulting soybean curd had an excellent mouth-feel and flavour. Some samples of the soybean curds were reserved for 3 months at room temperature but neither change in visual appearance nor modification in quality can be recognized, although there was found a slight syneresis.

EXAMPLE 2

300 kg of dehulled and hypocotyl-removed soybeans (U.S.A. production) were treated by superheated steam at 180° C. for 1 second with use of a tower-type sterilizing device (manufactured by Kikkoman Syoyu Co., Ltd. of Japan), 1500 kg of heated water at 60° C. were added thereto and then the soybeans were ground in double stages with use of a coarse grinder (—High Vis Line Mixer—manufactured by Tokusyu Kika Kogyo Co., Ltd. of Japan) and a fine grinder (—Micolloider—, manufactured by Tokusyu Kika Kogyo Co., Ltd. of Japan), respectively, each of the grinders being completely filled with the contents for preventing a taking-in of air therein. The resulting green slurry was centrifugally treated with use of a centrifugal separator (—Decanter HS-324L—, manufactured by Ishikawajima Harima Jyukogyo Kabushiki kaisha of Japan) to separate into a soybean milk and a curd residue (Okara). Yield of the soybean milk was 1440 kg and the soybean milk showed a solid content of 13 weight %, protein concentration of 5.5 weight % and viscosity of 10.5 cps. The resulting soybean milk was deaerated and thermally treated with use of a plate type heat exchanger (Type DHX-C$_2$H$_2$-2000, manufactured by Iwai Kikai Kogyo Co., Ltd. of Japan) at 123° C. for 13 seconds, cooled to 10° C.

Meanwhile, an aqueous solution containing magnesium chloride and calcium chloride in amounts of 20 and 10 weight %, respectively was thermally debacterized with use of the plate type heat exchanger (Type DHX-C$_2$H$_2$-2000 manufactured by Iwai Kikai Kogyo Co., Ltd. of Japan) and cooled to obtain an aseptic coagulant solution.

The aseptic coagulant solution was added in an amount of 1.0% by volume to and mixed with the aseptic soybean milk under aseptic atmosphere and filled in each aseptic container which was sealed under aseptic atmosphere, with use of an aseptic packing and sealing device (Type AB3, manufactured by Tetrapack Co., Ltd.). The containers accommodating the mixture of soybean milk and coagulant were immersed in hot water at 90° C. for 40 minutes and then cooled by cold water to room temperature to obtain packed aseptic soybean curds.

The resulting soybean curd had an excellent mouth-feeling and flavour. Some samples of the soybean curds were reserved for 3 months at room temperature but neither change in visual appearance nor modification in quality can be recognized, although there was found a slight syneresis.

TEST EXAMPLE (SENSORY TEST AND MEASUREMENT OF WATER SEPARATION RATE)

(1) Samples
(a) Control:
The soybean curd manufactured by the conventional process and with use of GDL as the coagulant, which corresponds to that as described in Experiment 11.
(b) Test:
The soybean curd obtained by Example 1.
(2) Sensory test
A sensory test was evaluated by an expert panel of 30 members and according to paired preference test.
(3) Procedure for measuring water separation rate
Each of the sample soybean curds was cut into cubic pieces of 5×5×5 mm, which was centrifugally treated with 1460 G for 10 minutes. Then, an amount of supernatant was measured and converted a resulting value into weight % to give the water separation rate.
(4) Results
Results are shown in following Table 11.

TABLE 11

| Testing Item | Control sample | Test sample |
| --- | --- | --- |
| Sensory Test | | |
| Mouth-feel | 6 persons | 24 persons (*) |
| Flavour | 9 persons | 21 persons (*) |
| Total evaluation | 8 persons | 22 persons (*) |
| Water separation rate | 21.0% | 13.6% |

In the Table, (*) means that there is the level of significant from control (p <0.05)

What is claimed is:
1. A process for the manufacture of packed aseptic soybean curd, which consists essentially of the steps of:
   thermally sterilizing soybeans which have been dehulled and from which hypocotyls have been removed, by exposing the soybeans to superheated steam at a temperature ranging from 150° to 200° C. for 1 to 2 seconds;
   adding hot water having a temperature not exceeding 80° C. to the sterilized soybeans and finely grinding them under an atmosphere in which migration of oxygen is excluded, to prepare a green slurry;
   separating the green slurry into a soybean milk and a curd residue;
   deairing the separated soybean milk and then heating the resulting soybean milk to sterilize it and cause a denaturation of soybean protein contained therein;
   aseptically adding a coagulant to the resulting soybean milk;
   filling the resulting mixture into an aseptic container under an aseptic atmosphere and sealing the container, and conducting coagulation of the soybean milk packed in the container.
2. A process an claimed in claim 1, wherein said hot water added to the thermally sterilized soybeans has a temperature ranging from 40° to 65° C.
3. A process as claimed in claim 1, wherein said step of sterilizing the soybean milk and causing the denaturation of soybean protein is carried out by heating the soybean milk to a temperature higher than 115° C.
4. A process as claimed in claim 1, wherein said step of sterilizing the soybean milk and causing the denaturation of soybean protein is carried out by heating the soybean milk for at least 1 second.

5. A process as claimed in claim 3, wherein said step of sterilizing the soybean milk and causing the denaturation of soybean protein is carried out by heating the soybean milk for at least 1 second.

6. A process as claimed in claim 1, further comprising a step of adding water to the curd residue separated from the green slurry to obtain secondary soybean milk.

* * * * *